United States Patent
Haskin et al.

(10) Patent No.: US 9,154,483 B1
(45) Date of Patent: Oct. 6, 2015

(54) SECURE DEVICE CONFIGURATION

(71) Applicant: AMAZON TECHNOLOGIES, INC., Reno, NV (US)

(72) Inventors: Menashe Haskin, Palo Alto, CA (US); Andrew Jay Roths, Kenmore, WA (US); Edward James Gayles, Tracy, CA (US); James David Meyers, Santa Clara, CA (US); Shih-Chun Chang, San Jose, CA (US); Vlad Troyanker, San Jose, CA (US); Mark Wodrich, Sammamish, WA (US); Daniel Christopher Bay, Santa Clara, CA (US); John Lawrence Miller, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 149 days.

(21) Appl. No.: 13/772,474

(22) Filed: Feb. 21, 2013

(51) Int. Cl.
*H04L 29/06* (2006.01)
*H04L 29/08* (2006.01)

(52) U.S. Cl.
CPC ............... *H04L 63/08* (2013.01); *H04L 29/06* (2013.01); *H04L 63/12* (2013.01); *H04L 67/104* (2013.01)

(58) Field of Classification Search
CPC ....... H04L 29/06; H04L 67/104; H04L 67/22; H04L 63/12; H04W 4/008
USPC .................. 726/7, 5; 709/226, 229, 243, 245; 713/153, 184; 370/230
See application file for complete search history.

(56) References Cited

U.S. PATENT DOCUMENTS

2006/0179139 A1* 8/2006 Gupta et al. .................. 709/225
2009/0158048 A1* 6/2009 Kim et al. ..................... 713/184

* cited by examiner

*Primary Examiner* — Harunur Rashid
*Assistant Examiner* — Angela Holmes
(74) *Attorney, Agent, or Firm* — Lindauer Law, PLLC

(57) ABSTRACT

Described herein are systems and methods for secure configuration provisioning of network credentials to configure a device to join one or more networks. One implementation provides for distribution of network credentials to associated devices without user intervention while maintaining security and avoiding distribution of the network credentials to external devices, such as a third-party server. Devices may be associated by purchase from a common merchant, registration to a common account, and so forth.

22 Claims, 10 Drawing Sheets

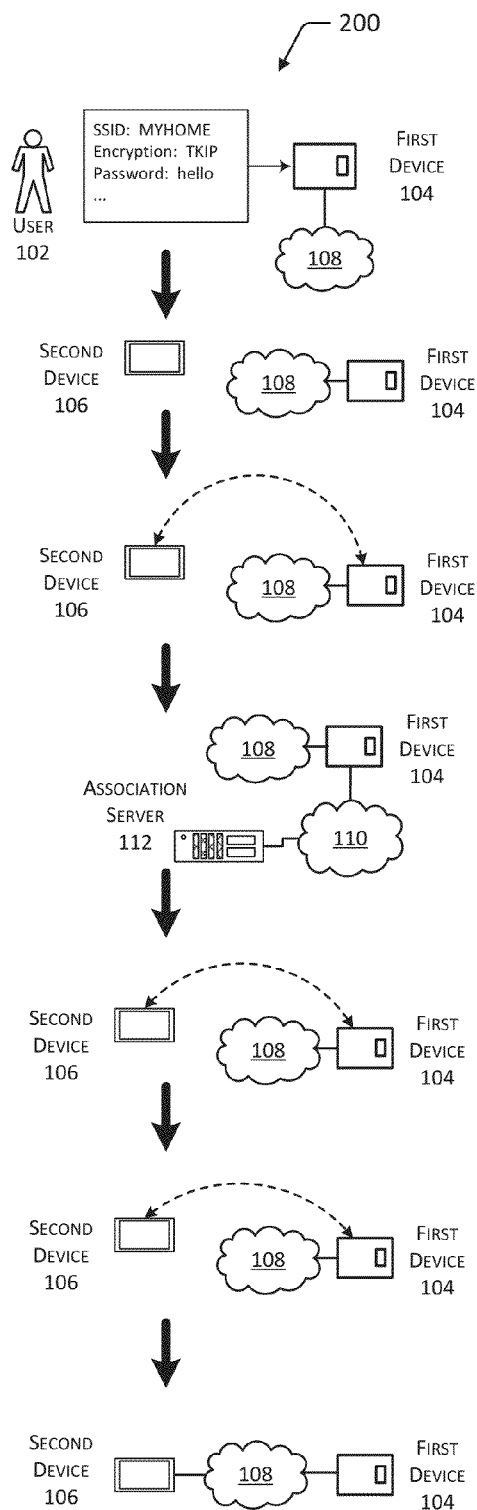

| | |
|---|---|
| 202 | USER CONFIGURES A FIRST DEVICE ON A FIRST NETWORK, SUCH AS A WLAN |
| 204 | USER BRINGS A SECOND DEVICE TO JOIN THE FIRST NETWORK |
| 206 | THE SECOND DEVICE ESTABLISHES A CONNECTION WITH THE FIRST DEVICE USING A SECOND NETWORK, AND REQUESTS NETWORK CREDENTIALS FROM THE FIRST DEVICE |
| 208 | THE FIRST DEVICE REQUESTS FROM A TRUSTED SERVER ASSOCIATION INFORMATION TO AUTHENTICATE THE SECOND DEVICE |
| 210 | THE FIRST DEVICE AUTHENTICATES THE SECOND DEVICE USING THE INFORMATION |
| 212 | THE FIRST DEVICE SENDS NETWORK CREDENTIALS TO THE AUTHENTICATED SECOND DEVICE USING THE SECOND NETWORK OR CONNECTION |
| 214 | BASED AT LEAST IN PART ON THE NETWORK CREDENTIALS, THE SECOND DEVICE JOINS THE FIRST NETWORK |

FIG. 2

SECURE DEVICE CONFIGURATION

BACKGROUND

An increasing number of devices are configured to connect to networks in order to exchange information. A device may join a network after being configured with network credentials. However, the configuration with network credentials has traditionally involved user intervention or the storage of those network credentials outside of the network. Users may have a negative user experience in providing the network credentials to devices on the network, or may be reluctant to have the network credentials stored elsewhere.

BRIEF DESCRIPTION OF DRAWINGS

FIG. 2 illustrates a scenario of secure configuration provisioning without user intervention and where the network credentials remain on the network.

Figure 1:
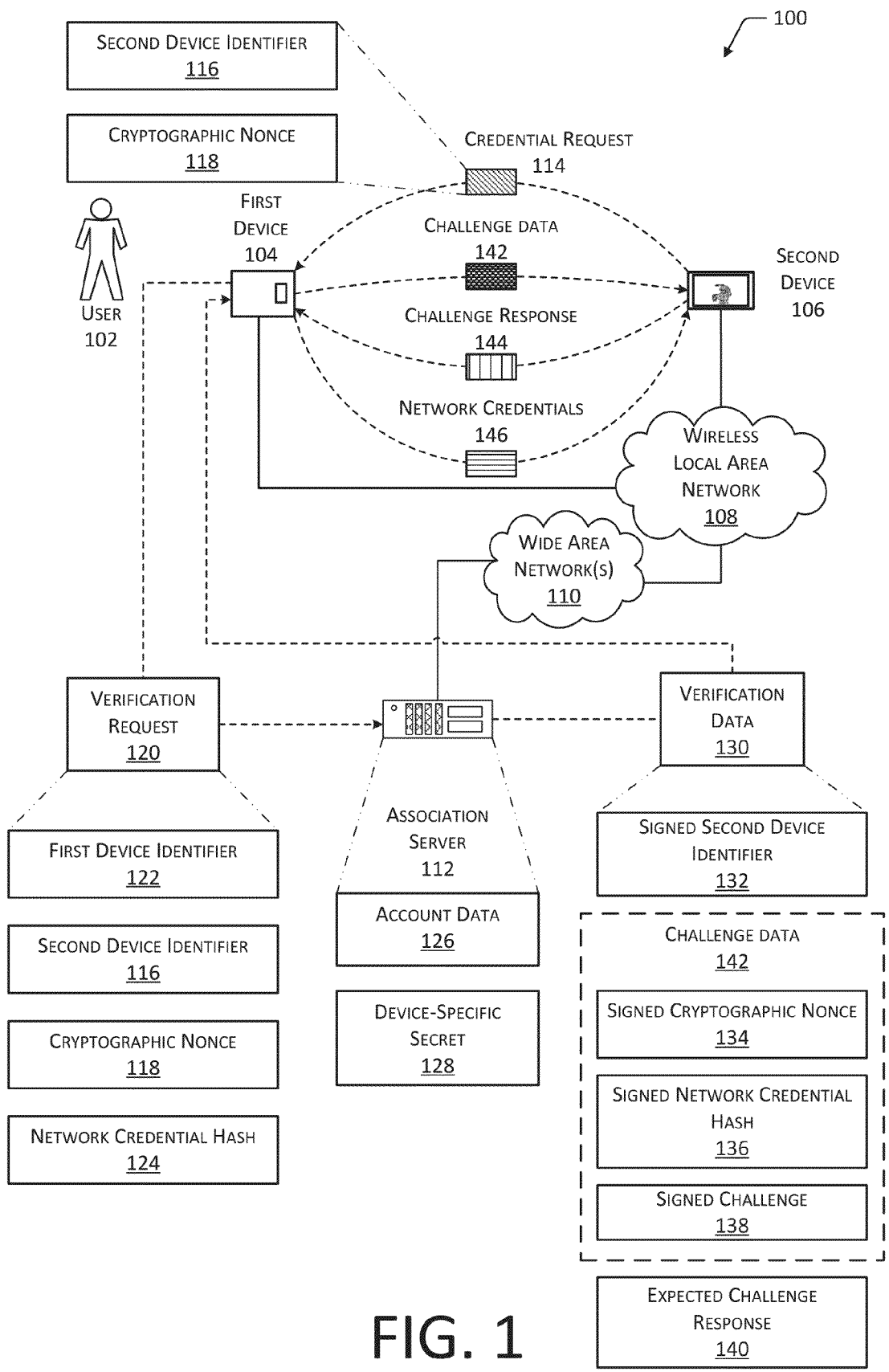
FIG. 1 is an illustrative system for providing secure configuration provisioning in which a device may receive network credentials with little or no intervention.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

A network allows two or more devices to communicate with one another and exchange information. A wide variety of devices are able to be configured to connect to one or more networks. The devices may include televisions, tablet computers, personal computers, electronic book readers, gaming consoles, set-top boxes, media players, vehicles, portable media players, smartphones, home automation devices, security systems, appliances, access points, routers, and so forth. The networks may include local area networks ("LANs"), personal area networks ("PANs"), and so forth. A LAN may use protocols compliant with at least a portion of the 802.11 standards promulgated by the Institute of Electrical and Electronic Engineers ("IEEE"). A PAN may communicate using the Bluetooth® standard as promulgated by the Bluetooth Special Interest Group.

Some networks may require the device to be configured with network credentials in order to join the network. These network credentials may include one or more of a network name, a password, an encryption type, an encryption key, and so forth. Devices which have the proper credentials may then join to the network and communicate with other devices which have joined the network. Different networks may share common physical layer implementations. For example several different 802.11 networks, each with a different service set identification ("SSID") and password may coexist in a given physical location.

At least some of the devices may be configurable to communicate with more than one network. Some networks may not use network credentials or may use network credentials which have previously been received by a particular device. For example, a first device joined to a first network may also form a peer-to-peer network with a second device which has not yet joined the first network.

Traditionally, joining a device to a network which requires network credentials has involved manual user intervention, storage of the network credentials on an external device such as an authentication server, and so forth. Manual intervention may result in an adverse user experience as a user may be called upon to input the network credentials, a process which may be prone to human error or confusion. Storage of the network credentials on the external device may be undesirable to some network administrators. Furthermore, such storage may call for enhanced security to safeguard the network credentials from compromise.

Described in this disclosure are methods and systems for secure configuration provisioning of network credentials for one or more networks to devices. Once securely provisioned, the device may join one or more networks. A first device may already be joined to the one or more networks. For example, the first device may have been manually configured previously, or may be the initial device which establishes the network. The first device is configured to communicate with a second device which is not yet joined to the one or more networks. This communication may use an unsecured default network using previously specified credentials, an alternative protocol, and so forth. For example, a peer-to-peer network may be established between the first device and the second device.

The second device requests credentials from the first device. The first device in turn communicates with an association server, which determines whether the first device and the second device are associated. This association may be by purchase from a common merchant, registration to a common account, manual user entry, and so forth. For example, when the first device and the second device are purchased from a same merchant account and delivered to a same address, they may be associated with one another.

The association server is configured to provide challenge data which is based on a device-specific secret which is known to the second device and the association server. The association server may also be configured to cryptographically sign information received from the first device, the second device, the challenge data, and so forth.

The challenge data is provided to the first device, which in turn uses a portion of this challenge information to determine that the second device is associated with the first device and entitled to receive the network credentials. The first device may then provide the network credentials to the second device. The second device uses these network credentials to join the one or more networks.

This process allows for secure configuration provisioning without user intervention improving the user experience. For example, a user purchases the second device, activates the second device in the user's home, and in a few moments the second device is configured and has joined the network. The process implements various cryptographic signatures, a cryptographic nonce, the association data, and a previously known device-specific secret to mitigate potential security exploits.

Furthermore, using this process the network credentials remain on the first device and are not sent to an external device which is outside the network, such as a server. Security of the network credentials may thus be improved by not sending the network credentials to the external device.

In situations where the automatic exchange of network credentials described above is unavailable, techniques are also discussed which involve minimal user intervention and avoid presenting the user with complicated network credential information. In one implementation, a first device receives a presented code which is manually input. The presented code was originally presented by the second device which seeks the network credentials. The first device generates a zero knowledge proof based on the entered code. The second device receives this zero knowledge proof to determine if the entered code corresponds to the presented code. The manual input minimizes or eliminates the likelihood of electronic eavesdropping, while the zero knowledge proof allows verification without the need to send the actual entered code over what may be an insecure connection. Furthermore, use of this technique reduces or eliminates the possibility of another device spoofing or maliciously causing the second device to join an unintended network. Once the second device has determined the correspondence between the presented code and the entered code, network credentials which have been sent to the second device may then be used to configure and join the one or more networks. Other implementations using manual input are also discussed.

Illustrative System

FIG. 1 is an illustrative system 100 for providing secure configuration provisioning in which a device may receive network credentials with little or no intervention. A single user 102 is shown, but it is understood that in some implementations more than one user 102 may be present, such as in a home, office, store, and so forth.

A first device 104 and a second device 106 are depicted. These devices may include televisions, tablet computers, personal computers, electronic book readers, gaming consoles, set-top boxes, media players, vehicles, portable media players, smartphones, home automation devices, security systems, appliances, access points, routers, and so forth. Each of the devices may be connected to one or more networks. The networks may include a wireless local area network ("WLAN") 108. The examples used herein are made with respect to a WLAN, however it is understood that the techniques described may be used with other networks such as cabled local area networks ("LANs"), personal area networks ("PANs"), and so forth. The WLAN 108 may use protocols which are compliant with at least a portion of the 802.11 standards promulgated by the Institute of Electrical and Electronic Engineers ("IEEE"). In one implementation, the PAN may communicate using the Bluetooth® standard as promulgated by the Bluetooth Special Interest Group.

The first device 104 has been previously joined to the WLAN 108. For example, the user 102 may have manually entered one or more network credentials into the first device 104, allowing the first device 104 to join the WLAN 108. Because the first device 104 has been joined to the WLAN 108, the first device 104 is able to use the WLAN 108 to communicate with other devices which have joined that network, such as an access point, gateway router, and so forth.

The WLAN 108 is configured to connect to external devices using a wide area network ("WAN") 110. For example, the access point of the WLAN 108 may be coupled to a gateway router which in turn connects to a communication interface device which connects to the WAN 110. The WAN 110 may comprise the Internet, a private network, cellular data network, and so forth. Connected to the WAN 110, and thus accessible to the first device 104 which is on the WLAN 108 which connects to the WAN 110, is an association server 112. The association server 112 is configured to assist the first device 104 and the second device 106 in determining that an association exists between the two. The association server 112 is discussed in more detail below.

The second device 106 may be newly brought to an area in which the WLAN 108 is accessible, may have been previously on the WLAN 108 but has been reset to default settings, or otherwise lacks the network credentials to successfully join the WLAN 108. For example, the user 102 may have recently purchased the second device 106 and brought it home where the WLAN 108 is available.

Because the second device 106 lacks the network credentials to join the WLAN 108, communication with the first device 104 using the WLAN 108 is not available. However, the first device 104 and the second device 106 may be able to communicate with one another using a previously defined set of network credentials, using no network credentials at all, or by using communications protocols and channels which differ from that used by the WLAN 108. For example, the first device 104 and the second device 106 may be able to communicate directly with one another without an intermediary access point using the Wi-Fi Direct® as promulgated by the Wi-Fi™ Alliance. In another implementation, the first device 104 and the second device 106 may both be able to communicate with the other using optical transceivers, Bluetooth®, and so forth.

The first device 104 and the second device 106 are configured to become aware of one another. In one implementation, the first device 104 may discover the presence of the second device 106. For example, the first device 104 may receive a transmission by the second device 106. In another implementation, the second device 106 may discover the presence of the first device 104. For example, the second device 106 may receive a transmission by the first device 104. In yet another implementation, a third device may make the determination that the second device 106 is within communication range of the first device 104. For example, a geolocation server may provide data indicating that both the first device 104 and the second device 106 are likely to be within range of the same WLAN 108. The discovery may involve the use of data broadcasts, previously stored information, manual input, and so forth. For example, the second device 106 may have been configured such that the WLAN 108 may be available based at least in part on a delivery address associated with physical shipment of the second device 106 to the user 102.

The second device 106 provides a credential request 114 to the first device 104, using a connection other than the WLAN 108. For example, the second device 106 may use Wi-Fi Direct® to send the credential request 114. In some implementations, the second device 106 may receive information from the first device 104 which, when processed by the second device 106, initiates the credential request 114. For example, the first device 104 may send a packet indicating the presence of the first device and the WLAN 108. This packet is received by the second device 106, which responds by sending the credential request 114.

The credential request 114 may include a second device identifier 116 and a cryptographic nonce 118. The second device identifier 116 is used to distinguish the second device 106 from other devices. The second device identifier 116 may be based at least in part on a model number of the second device 106, serial number of the second device 106, and so forth.

The cryptographic nonce 118 comprises an arbitrary value, such as a number or a string. The arbitrary value is not used to encode other information. The cryptographic nonce 118 is not reused. The cryptographic nonce 118 may be configured to be valid for a limited period of time or for a limited scope of use. The cryptographic nonce 118 may be generated by the second device 106 using a random or pseudo-random number generator. As described below, the cryptographic nonce 118 is used at least in part so the second device 106 can confirm that information later received actually corresponds to the credential request 114.

The first device 104 receives the credential request 114. Based at least in part on the credential request 114, the first device 104 generates and sends a verification request 120 to the association server 112. The verification request 120 may include a first device identifier 122, the second device identifier 116, the cryptographic nonce 118, and a network credential hash 124. The first device identifier 122, as above with the second device identifier 116, distinguishes the first device 104 from other devices. The first device 104 has the network credentials for joining the WLAN 108. The first device 104 generates the network credential hash 124 based at least in part on the network credentials. By sending the network credential hash 124 in the verification request 120, rather than the network credentials, the external device such as the association server 112 never learns the network credentials. Thus, use of the network credential hash 124 may improve security of the WLAN 108.

The association server 112 accepts the verification request 120 and accesses account data 126 to determine if the first device 104 and the second device 106 are associated. This association may be that the first device 104 and the second device 106 have been purchased from a common merchant, are registered to a common account, were shipped to the same delivery address, have been paid for with a common method of payment, previous data which was manually entered, and so forth. For example, when the first device 104 and the second device 106 are purchased from a same merchant account and delivered to a same address, they may be associated with one another.

The association server 112 is also configured to maintain, or have access to, device-specific secrets 128. These device-specific secrets 128 comprise data which is known to the second device 106 and the association server 112. In some implementations, the device-specific secrets 128 may include data which is stored on the second device 106 during manufacture. In some implementations, the secret used may be associated with a group of devices. For example, a group-specific secret may be associated with devices which are delivered to a school.

The association server 112 generates verification data 130 which is then sent to the first device 104. The association server 112 may be configured to cryptographically sign the verification data 130 or pieces of the verification data 130. For example, the cryptographic nonce 118 which was received originally from the second device 106 and relayed by the first device 104 to the association server 112 may be signed to form a signed cryptographic nonce 134. The network credential hash 124 may also be cryptographically signed to form a signed network credential hash 136.

The association server 112 is configured to generate a challenge. The challenge is based at least in part on the device-specific secret 128, and thus is specific to the second device 106. This challenge is cryptographically signed to form a signed challenge 138. The association server 112 is also configured to generate an expected challenge response 140 to the signed challenge 138. In some implementations, the expected challenge response 140 may be cryptographically signed as well.

The verification data 130 is provided to the first device 104. For example, the association server 112 may send the verification data 130 using the WAN 110 and the WLAN 108. The first device 104 may be configured to verify the cryptographic signatures of at least some of the verification data 130. For example, the first device 104 may use the signature to confirm that the association server 112 was the source of the signed challenge 138.

A portion of the verification data 130 may be designated as challenge data 142. The challenge data may include the signed cryptographic nonce 134, the signed network credential hash 136, and the signed challenge 138. The first device 104 sends the challenge data 142 to the second device 106. The second device 106 receives and verifies the challenge data 142. The verification may include confirming that the signed cryptographic nonce 134 corresponds to the cryptographic nonce 118 originally generated by the second device 106, and that the nonce is still valid. The verification may also include verification of the signature of the signed cryptographic nonce 134, allowing the second device 106 to verify that the same cryptographic nonce 118 was processed by the association server 112.

Once verified, the second device 106 uses the signed challenge 138 to generate a challenge response 144 to the signed challenge 138. In some implementations, the generation of the challenge response 144 may be based at least in part on the device-specific secret 128 which has been previously stored on the second device 106, such as during manufacture. The second device 106 may also determine the authenticity of the signed network credential hash 136 by checking the cryptographic signature. The second device 106 may then send the challenge response 144 to the first device 104.

The first device 104 receives the challenge response 144 and verifies against the expected challenge response 140. This verification allows the first device 104 to be assured that the first device 104 and the second device 106 are associated, and that the network credentials 146 may be appropriately provided to the second device 106. The first device 104 sends network credentials 146 to the second device 106. The network credentials 146 may include data indicative of one or more of a service set identification ("SSID") for the WLAN 108, a password associated with the WLAN 108, a wireless channel for the WLAN 108, encryption used for the WLAN 108, and so forth. The network credentials 146 may include one or more pieces of information indicative of a network configuration stored by the first device 104.

The second device 106 receives the network credentials 146 and verifies the network credentials 146 against the signed network credential hash 136. This allows the second device 106 to confirm that the first device 104 has provided the network credentials 146, and that the network credential hash 124 was cryptographically signed by the association server 112. With the network credentials 146 corresponding to the signed network credential hash 136, the second device 106 may now be configured to join the WLAN 108.

Implementation of this process thus allows the second device 106 to join the WLAN 108 without undue or complicated configuration on the part of the user 102. Furthermore, the network credentials 146 remain secure within the WLAN 108, rather than being sent to an external server.

Communications between the first device 104, the second device 106, the association server 112, and so forth may be encrypted. This encryption may secure socket layers ("SSL"), transport layer security ("TLS"), and so forth. This encryption is used to mitigate eavesdropping on the communications. Without the network credentials 146 these communications may be encrypted but do not necessarily provide authentication as to the identity of the devices involved in the communication. For example, public keys may be exchanged between the devices to allow for encrypted communications.

FIG. 2 illustrates a scenario 200 of secure configuration provisioning using the system 100 described above. In this scenario, the network credentials 146 may be provided to the second device 106 without user intervention and without sending or storing the network credentials 146 outside of the WLAN 108.

At 202, the user 102 configures the first device 104 on a first network, such as the WLAN 108. This configuration may include manually inputting the network credentials 146, receiving from another device such as an access point the network credentials 146, and so forth. The WLAN 108 illustrated here may be within a home network, such as that previously configured at the user's 102 residence with the SSID of "MYHOME".

At 204, the user 102 brings the second device 106 to join the first network, such as the WLAN 108. For example, the user 102 may have physically received the second device 106 and activated it while at the residence.

At 206, the second device 106 establishes a connection with the first device 104. This connection may result in the first device 104 and the second device 106 establishing a second network between the two devices. This second network may use previously defined network credentials 146. Or the second network may be configured such that network credentials 146 are not used for communication. The second network may use the same communication interface as the first network, or may use a different communication interface. For example, the second network may also use Wi-Fi™, but may use a different SSID, no encryption, and may be configured to operate on a particular group of radio frequency channels. In another example, the second network may use Bluetooth® to establish communication between the devices.

This connection may be configured to be encrypted, even though the devices participating may be unauthenticated to one another. The newly discovered devices may exchange public keys with one another to allow for the establishment of an encrypted exchange. For example, the devices may implement the transport layer security protocol.

At 208, the first device 104 requests from a trusted server, such as the association server 112, information to authenticate the second device 106. Responsive to the request, at 210, the first device 104 proceeds to authenticate the second device 106. At 212, the first device 104 sends the network credentials 146 to the second device 106. Based at least in part on the network credentials 146, the second device 106 configures a communication interface and joins the first network, such as the WLAN 108.

With the first device 104 and the second device 106 on a common network, such as the first network comprising the WLAN 108, the connection using the second network may be discontinued. The second device 106 may be configured to re-initiate the process upon a change in geographic location, changes in use time, loss of connectivity with the WLAN 108, receiving data to restart the process, and so forth.

Figure 3:
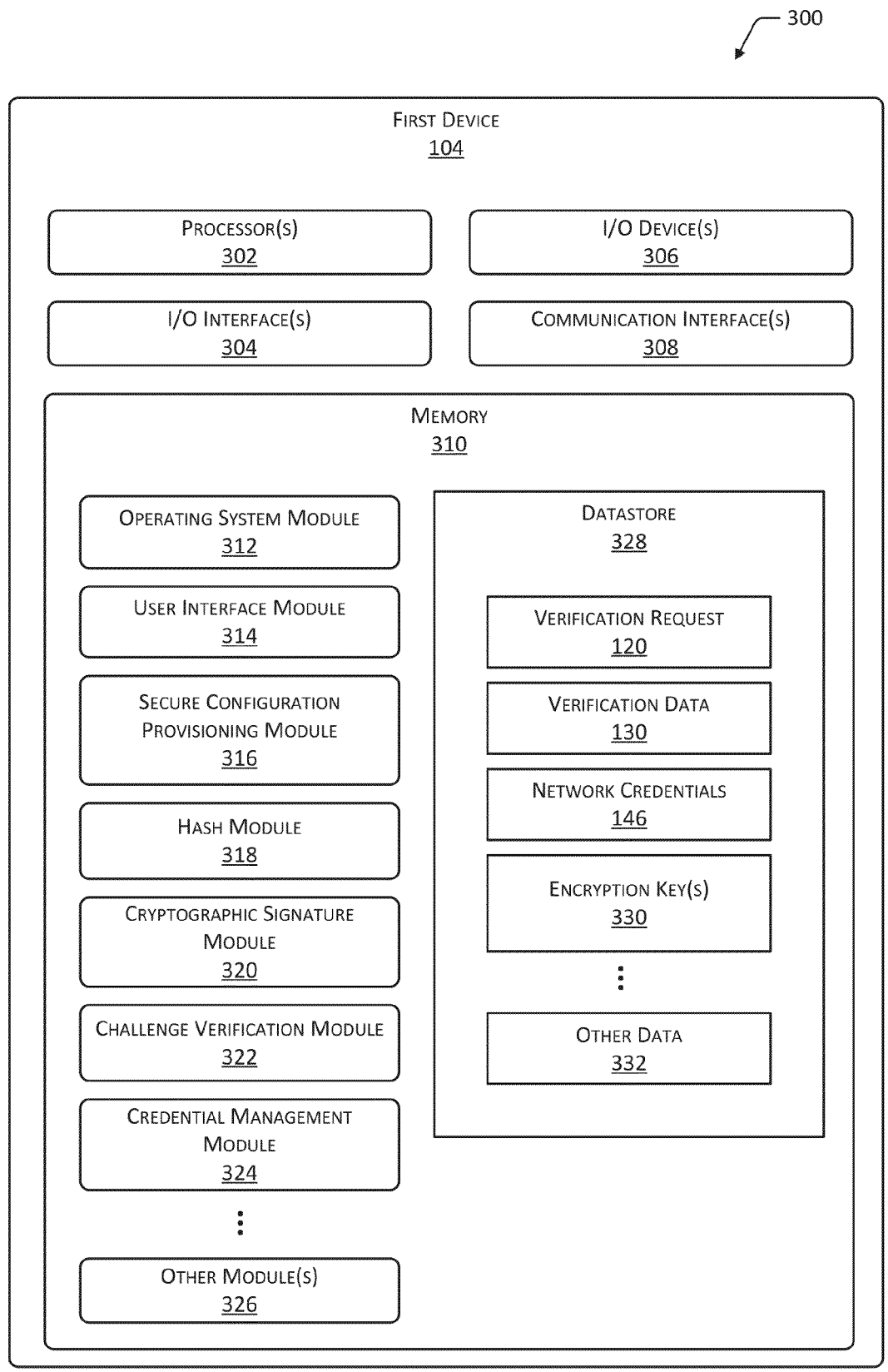
FIG. 3 illustrates a block diagram of a first device configured to support secure configuration provisioning on a network in which network credentials are provided to other devices on the network.

FIG. 3 illustrates a block diagram 300 of the first device 104 as configured to support secure configuration provisioning on the WLAN 108 or another network. The first device 104 may include one or more processors 302 configured to execute one or more stored instructions. The processors 302 may comprise one or more cores. The first device 104 may include one or more input/output ("I/O") interface(s) 304 to allow the processor 302 or other portions of the first device 104 to communicate with other devices. The I/O interfaces 304 may comprise inter-integrated circuit ("I2C"), serial peripheral interface bus ("SPI"), Universal Serial Bus ("USB") as promulgated by the USB Implementers Forum, RS-232, one or more media device interfaces such as High Definition Multimedia Interface ("HDMI") as promulgated by HDMI Licensing LLC, TOSLINK® as promulgated by Toshiba Corp., analog video, analog audio, IEEE 1394 as promulgated by the IEEE, and so forth.

The I/O interface(s) 304 may couple to one or more I/O devices 306. The I/O devices 306 may include input devices such as one or more of a camera, a microphone, a touch sensor, a button, and so forth. The I/O devices 306 may also include output devices such as one or more of a display, audio speakers, haptic output devices, and so forth. In some embodiments, the I/O devices 306 may be physically incorporated with the first device 104 or may be externally placed.

The first device 104 may also include one or more communication interfaces 308. The communication interfaces 308 are configured to provide communications between the first device 104 and other devices such as other media devices, routers, access points, servers, and so forth. The communication interfaces 308 may include devices configured to couple to one or more networks including PANs, LANs, WLANs 108, WANs 110, and so forth. For example, Ethernet, Wi-Fi™, Bluetooth®, ZigBee®, and so forth.

The first device 104 may also include one or more busses or other internal communications hardware or software that allow for the transfer of data between the various modules and components of the first device 104.

As shown in FIG. 3, the first device 104 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer readable instructions, data structures, program modules and other data for the operation of the first device 104.

The memory 310 may include at least one operating system ("OS") module 312. The OS module 312 is configured to manage hardware resource devices such as the I/O interfaces 304, the I/O devices 306, the communication interfaces 308, and provide various services to applications or modules executing on the processors 302. The OS module 312 may also be configured to support encrypted communications such as SSL, TLS, or other protocols with other devices such as the second device 106, the association server 112, an access point, and so forth.

Also stored in the memory 310 may be one or more of the following modules. These modules may be executed as foreground applications, background tasks, daemons, and so forth.

A user interface module 314 is configured to provide a user interface to the user 102 using the I/O devices 306 and to accept inputs received from the I/O devices 306. The user interface may include one or more visual, audible, or haptic elements. For example, the user interface may be configured to provide a graphic user interface, an audible user interface, and so forth.

A secure configuration provisioning module 316 (or "provisioning module") is also stored in the memory 310. The provisioning module 316 is configured to support the processes described in this disclosure. This may include receiving the credential requests 114, generating verification requests 120, receiving verification data 130, communicating with the second device 106, coordinating the actions of other modules, and so forth.

A hash module 318 is configured to generate one or more hashes from inputs, verify hashes, and so forth. The hash module 318 may be configured to generate the network credential hash 124 based on one or more portions of the network credentials 146. In one implementation, the network credential hash 124 may be based on the SSID and the password of the WLAN 108.

A cryptographic signature module 320 is configured to provide cryptographic signatures for files or other data. The cryptographic signature module 320 may be configured to verify or validate cryptographic signatures.

A challenge verification module 322 is configured to compare a challenge response 144 with an expected challenge response 140 to determine if a challenge has been satisfied. As described below in more detail, this challenge allows the first device 104 to be assured that the second device 106 with which it is in communication is properly associated and entitled to receive the network credentials 146.

A credential management module 324 is configured to manage network credentials 146 which have been received, provide network credentials 146 to other devices, and so forth. For example, the secure configuration provisioning module 316 may be configured to direct the credential management module 324 to send the network credentials 146 to the second device 106 after receipt of a correct challenge response 144.

Other modules 326 may also be present. For example, a digital rights management module may provide support for presenting or processing content protected using one or more digital rights management schemes.

One or more of the modules described above may be configured to execute in one or more secure modules. The secure module may comprise dedicated memory, dedicated processor, or other resources configured to improve security of the modules executing therein.

The memory 310 may also include a datastore 328 to store information. The datastore 328 may use a flat file, database, linked list, tree, or other data structure to store the information. In some implementations, the datastore 328 or a portion of the datastore 328 may be distributed across one or more other devices including servers, network attached storage devices and so forth.

As depicted here, the datastore 328 may store one or more of the verification requests 120, the verification data 130, or the network credentials 146. The datastore 328 may also include encryption key(s) 330. For example, where the secure communications involve the use of public key and private key cryptography, the public key and the private key of the first device 104, the public keys of the second device 106 and the association server 112, and so forth may be stored. Other data 332 may also be stored. For example, the other data 332 may include user preferences, configuration files, and so forth.

In some implementations, the first device 104 may also store the modules and data depicted below with respect to the second device 106, and vice versa. In this implementation, the second device 106 may later act to assist the secure configuration provisioning of another device which is seeking the network credentials 146. Likewise, the first device 104 which needs to acquire network credentials 146 may send a credential request 114 to another device.

Figure 4:
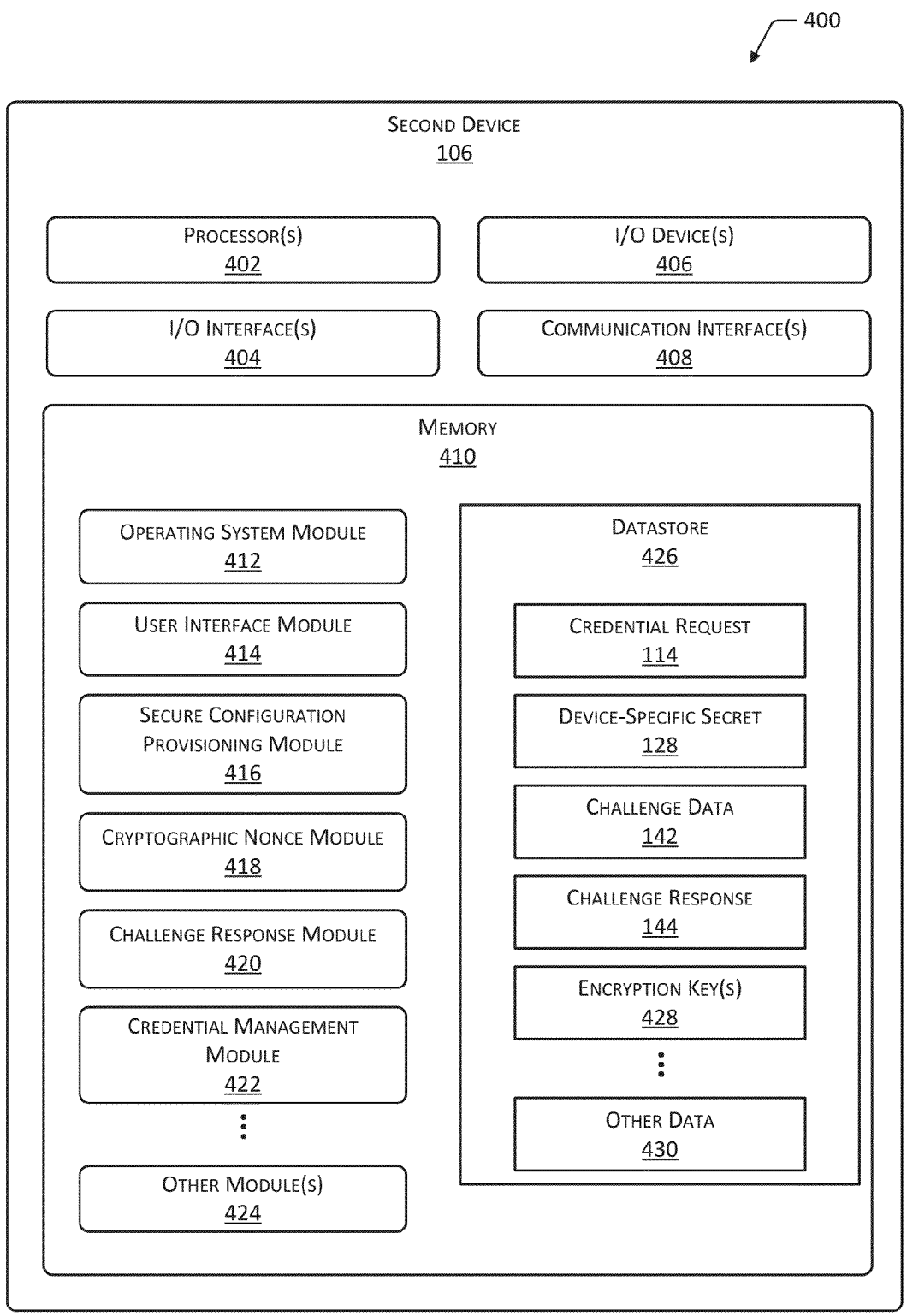
FIG. 4 illustrates a block diagram of a second device configured to receive network credentials using the secure configuration provisioning.

FIG. 4 illustrates a block diagram 400 of the second device 106 configured to receive the network credentials 146 using the secure configuration provisioning described. As described above, the second device 106 may seek the network credentials 146 necessary to join one or more networks, such as the WLAN 108.

The second device 106 may include one or more processors 402 configured to execute one or more stored instructions. The processors 402 may comprise one or more cores. The second device 106 may include one or more I/O interface(s) 404 to allow the processor 402 or other portions of the second device 106 to communicate with other devices. The I/O interfaces 404 may comprise I2C, SPI, USB, RS-232, one or more media device interfaces, and so forth.

The I/O interface(s) 404 may couple to one or more I/O devices 406. The I/O devices 406 may include input devices such as one or more of a camera, a microphone, a touch sensor, a button, and so forth. The I/O devices 406 may also include output devices such as one or more of a display, audio speakers, haptic output devices, and so forth. In some embodiments, the I/O devices 406 may be physically incorporated with the second device 106 or may be externally placed.

The second device 106 may also include one or more communication interfaces 408. The communication interfaces 408 are configured to provide communications between the second device 106 and other devices, such as other devices, routers, access points, servers, and so forth. The communication interfaces 408 may include devices configured to couple to one or more networks including PANs, LANs, WLANs 108, WANs 110, and so forth. For example, the networks may use Ethernet, Wi-Fi™, Bluetooth®, ZigBee®, and so forth.

The second device 106 may also include one or more busses or other internal communications hardware or software that allow for the transfer of data between the various modules and components of the second device 106.

As shown in FIG. 4, the second device 106 includes one or more memories 410. The memory 410 comprises one or more CRSM. The memory 410 provides storage of computer readable instructions, data structures, program modules and other data for the operation of the second device 106.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may also be configured to support encrypted communications such as SSL, TLS, or other protocols with other devices such as the first device 104, the association server 112, an access point, and so forth.

Also stored in the memory 410 may be one or more of the following modules. These modules may be executed as foreground applications, background tasks, daemons, and so forth.

A user interface module 414 is configured to provide a user interface to the user 102 using the I/O devices 406 and to accept inputs received from the I/O devices 406. The user interface may include one or more visual, audible, or haptic elements. For example, the user interface may be configured to provide a graphic user interface, an audible user interface, and so forth.

A secure configuration provisioning module 416 (or "provisioning module") is also stored in the memory 410. The provisioning module 416 is configured to support the processes described in this disclosure. This may include generating the credential requests 114, communicating with the first device 104, coordinating the actions of other modules, and so forth.

A cryptographic nonce module 418 is configured to generate the cryptographic nonce 118. The cryptographic nonce 118 is an arbitrary value, and may be generated using a random or pseudo-random number generator. The cryptographic nonce module 418 may also be configured to compare nonce values, such as the cryptographic nonce 118 as originally generated and the signed cryptographic nonce 134 to determine if the two are equivalent.

A challenge response module 420 is configured to process the signed challenge 138 and generate the challenge response 144. In some implementations, the processing of the signed challenge 138 may be based at least in part on the device-specific secret 128. The challenge response module 420 may be directed by the secure configuration provisioning module 416 to send the challenge response 144 after the cryptographic nonce module 418 has verified the signed cryptographic nonce 134, and that the signature of the signed cryptographic nonce 134 is valid.

A credential management module 422 is configured to manage network credentials 146 which have been received, provide network credentials 146 to other devices, and so forth. For example, the secure configuration provisioning module 416 may be configured to direct the credential management module 422 to use the network credentials 146 to configure the second device 106 to join the WLAN 108 or other networks.

Other modules 424 may also be present. For example, a speech recognition module may be configured to accept spoken input. As described above, one or more of the modules described above may be configured to execute in one or more secure modules. The secure module may comprise dedicated memory, dedicated processor, or other resources configured to improve security of the modules executing therein.

The memory 410 may also include a datastore 426 to store information. The datastore 426 may use a flat file, database, linked list, tree, or other data structure to store the information. In some implementations, the datastore 426 or a portion of the datastore 426 may be distributed across one or more other devices including servers, network attached storage devices, and so forth.

As depicted here, the datastore 426 may store one or more of the credential request 114, the device-specific secret 128, the challenge data 142, the challenge response 144, and so forth. The datastore 426 may also include encryption key(s) 428. As described above, this may include public keys and private keys to support secure communications. Other data 430 may also be stored. For example, the other data 430 may include user preferences, configuration files, and so forth.

Figure 5:
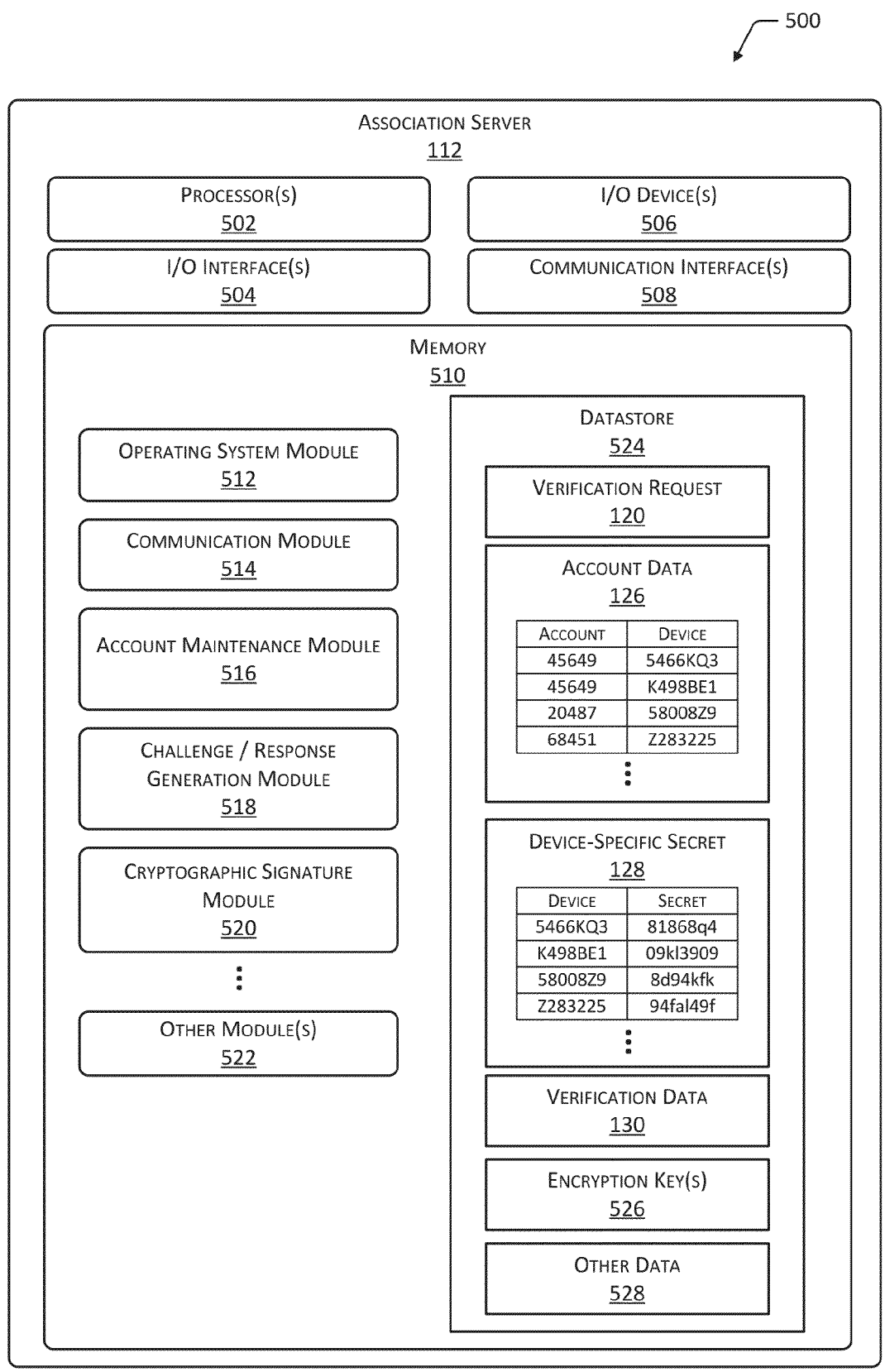
FIG. 5 illustrates a block diagram of an association server configured to support secure configuration provisioning.

FIG. 5 illustrates a block diagram 500 of the association server 112 configured to support secure configuration provisioning. The association server 112 may include one or more processors 502 configured to execute one or more stored instructions. The processors 502 may comprise one or more cores. The association server 112 may include one or more I/O interface(s) 504 to allow the processor 502 or other portions of the association server 112 to communicate with other devices. The I/O interfaces 504 may comprise I2C, SPI, USB, RS-232, one or more media device interfaces, and so forth.

The I/O interface(s) 504 may couple to one or more I/O devices 506. The I/O devices 506 may include input devices such as one or more of a camera, a microphone, a touch sensor, a button, and so forth. The I/O devices 506 may also include output devices such as one or more of a display, audio speakers, haptic output devices, and so forth. In some embodiments, the I/O devices 506 may be physically incorporated with the association server 112 or may be externally placed.

The association server 112 may also include one or more communication interfaces 508, similar to those described above with respect to FIG. 4. The association server 112 may also include one or more busses or other internal communications hardware or software that allow for the transfer of data between the various modules and components of the association server 112.

As shown in FIG. 5, the association server 112 includes one or more memories 510. The memory 510 comprises one or more CRSM. The memory 510 provides storage of computer readable instructions, data structures, program modules and other data for the operation of the association server 112.

The memory 510 may include at least one OS module 512. The OS module 512 is configured to manage hardware resource devices such as the I/O interfaces 504, the I/O devices 506, the communication interfaces 508, and provide various services to applications or modules executing on the processors 502. The OS module 512 may also be configured to support encrypted communications such as SSL, TLS, or other protocols with other devices such as the first device 104, the second device 106, an access point, and so forth.

Also stored in the memory 510 may be one or more of the following modules. These modules may be executed as foreground applications, background tasks, daemons, and so forth.

A communication module 514 is configured to support communication between the association server 112 and other devices including the first device 104. The communication module 514 may be configured to implement one or more application programming interfaces ("API").

An account maintenance module 516 is configured to manage information such as the account data 126, the device-specific secrets 128, and so forth. In one implementation, the account maintenance module 516 may be configured to receive information from merchants, manufacturers, and so forth. This information may be used to maintain or update the account data 126, the device-specific secrets 128, and so forth.

A challenge/response generation module 518 is configured to generate the challenge and the expected challenge response 140. The challenge may be based at least in part on the device-specific secret 128 associated with the second device 106. In one implementation, the expected challenge response 140 may be based on processing the challenge with a function such as HMAC-SHA-256.

A cryptographic signature module 520 is configured to cryptographically sign files or other data, verify cryptographic signatures, and so forth. For example, the cryptographic signature module 520 may be configured to cryptographically sign the challenge to form the signed challenge 138.

Other modules 522 may also be present. For example, a billing module may be configured to manage billing functions associated with the devices.

The memory 510 may also include a datastore 524 to store information. As described above, the datastore 524 may use a flat file, database, linked list, tree, or other data structure to store the information. In some implementations, the datastore 524 or a portion of the datastore 524 may be distributed across one or more other devices including servers, network attached storage devices, and so forth.

As depicted here, the datastore 524 may store one or more of the verification request 120, the account data 126, the device-specific secret 128, the verification data 130, and so forth.

The account data 126 provides information which associates devices. In one implementation, this information may include a table, such as that depicted here. In this table several accounts are listed, along with device identifiers for the associated devices. For example, device identifier "5466KQ3" and "K498BE1" are associated with the same account "45649". As described above, this association may be based on one or more factors, such as a common delivery address, method of payment, user account, and so forth.

The device-specific secret 128 associates a particular secret with a particular device. For example, device "5466KQ3" has the associated device-specific secret 128 of "81868q4". As described above, the device-specific secret 128 may be used to generate at least a portion of the challenge data 142.

The datastore 524 may also include encryption key(s) 526. As described above, these may include public keys and private keys to support secure communications.

Other data 528 may also be stored. For example, the other data 528 may include billing information, data about expired nonces or keys, a blacklist of devices to not respond to, and so forth. Continuing the example, a device identifier of a device which is suspected or known to be associated with attempts to compromise the security of the system 100 may be blacklisted, such that secure configuration provisioning is unavailable.

Illustrative Scenarios and Processes

Figure 6:
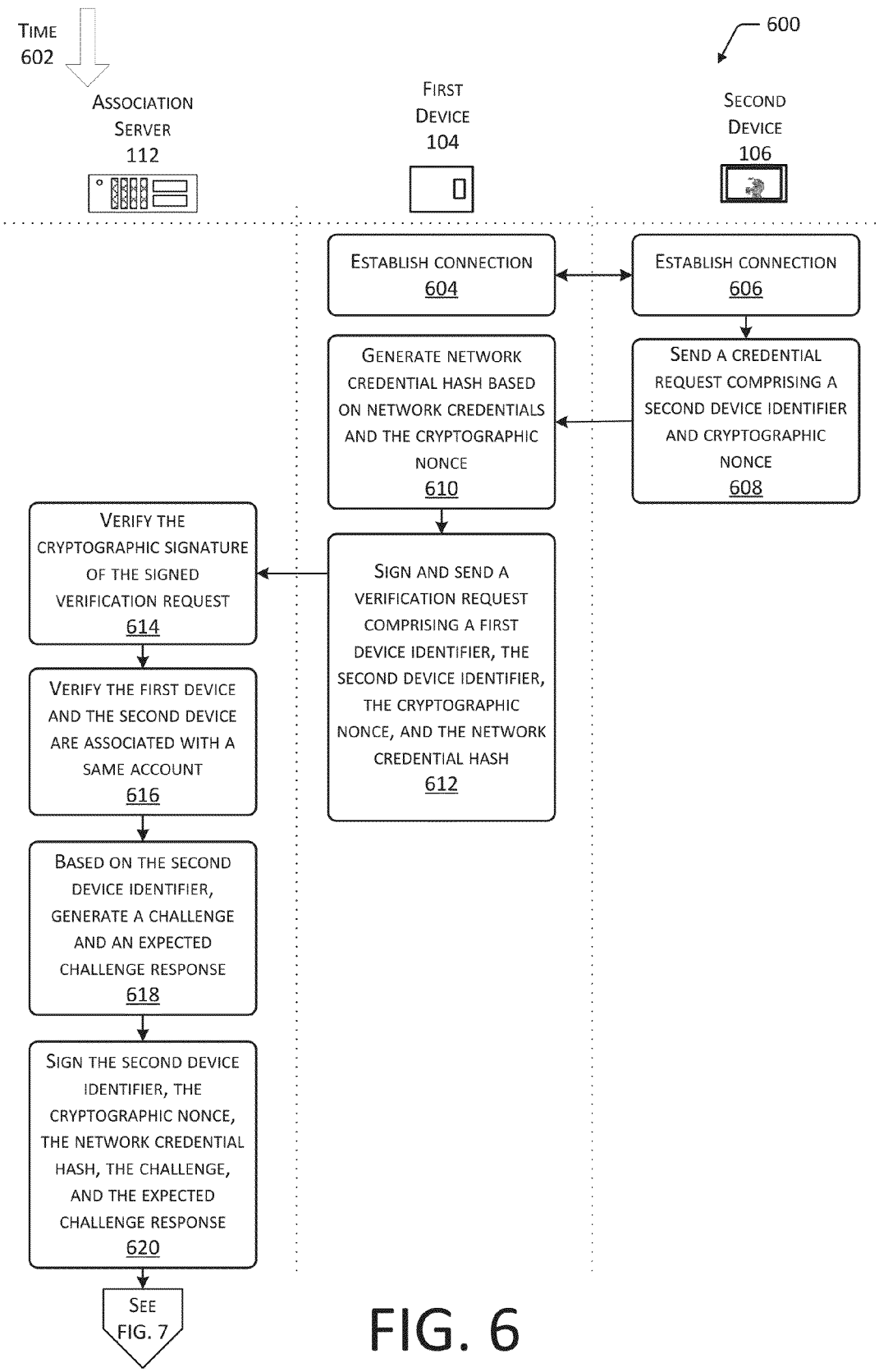
FIGS. 6 and 7 depict a flow diagram of a process of secure configuration provisioning using the first device, the second device, and the association server.
Figure 7:
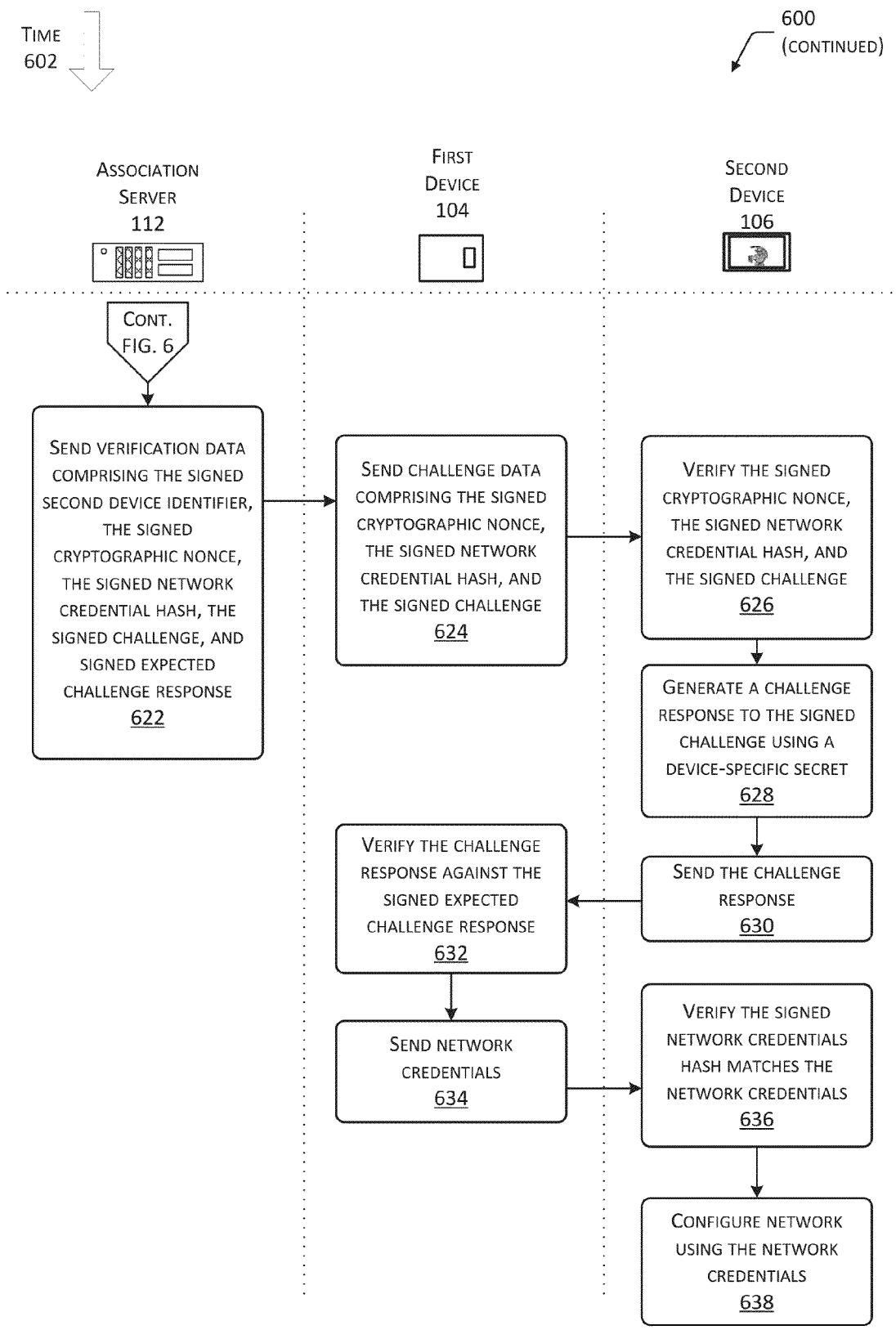

FIGS. 6 and 7 depict a flow diagram 600 of a process of secure configuration provisioning using the first device, the second device, and the association server. In this illustration, time increases down the page, as indicated by the arrow 602. Horizontally across the page are the association server 112, the first device 104, and the second device 106. The process may be implemented by one or more of these devices.

Blocks 604 and 606 establish a connection between the first device 104 and the second device 106. As described above, in some implementations, this connection may be secured, such as by implementing SSL, TLS, and so forth. The connection is secure in that it is encrypted. However, even when encrypted, the identity of the devices in the connection may not be authenticated. This connection between the first device 104 and the second device 106 does not utilize the WLAN 108 or another network to which the second device 106 has not yet received the network credentials 146.

Block 608, at the second device 106, sends a credential request 114 comprising the second device identifier 116 and the cryptographic nonce 118. As described above, the cryptographic nonce 118 may be configured to expire or become invalid after a predetermined period of time. As also described above, the second device identifier 116 is indicative of the identity of the second device 106.

The first device 104 receives from the second device 106 the credential request 114. Block 610, at the first device 104, generates the network credential hash 124. The network credential hash 124 is generated by applying a hash function to at least a portion of the network credentials 146. The network credentials 146 may comprise data associated with connecting to a network. For example, the data may include SSID, password, encryption type used, and so forth. In some implementations, the network credential hash 124 may also be generated based on the cryptographic nonce 118.

Block 612, at the first device 104, cryptographically signs and sends the verification request 120 to the association server 112. As described above, the verification request 120 includes the first device identifier 122, the second device identifier 116, the cryptographic nonce 118, and the network credential hash 124.

The association server 112 receives the verification request 120. In some implementations, the verification request 120 may be cryptographically signed by the first device 104. In implementations where the verification request 120 is cryptographically signed, block 614 verifies the cryptographic signature of the signed verification request 120.

Block 616, at the association server 112, verifies the first device 104 and the second device 106 are associated. This association may be indicated by data stored at or accessible to the association server 112. For example, both devices may be registered to the same user account. In some implementations, the verification may include lookup of the device identifiers in the account data 126.

Block 618, based at least in part on the second device identifier, generates the challenge and the expected challenge response 140 for the second device 106. As described above, the challenge and the expected challenge response 140 may be based at least in part on the device-specific secret 128 which is known to the association server 112.

Block 620 cryptographically signs the verification data 130. As described above, the verification data 130 comprises the second device identifier 116 to create the signed cryptographic nonce 134, the network credential hash 124 to create the signed network credential hash 136, and the challenge to create the signed challenge 138. In some implementations, the expected challenge response 140 may not be cryptographically signed.

Continuing to FIG. 7, block 622 sends the verification data 130 to the first device 104. As described above, the verification data 130 comprises the signed second device identifier 132, the signed cryptographic nonce 134, the signed network credential hash 136, the signed challenge 138, and the signed expected challenge response 140. In some implementations, the expected challenge response 140 may be left unsigned.

The first device 104 receives from the association server 112 the verification data 130. In some implementations, the first device 104 may verify the cryptographic signatures of the verification data 130 to confirm the verification data 130 originates from the association server 112.

Block 624, at the first device 104, sends the challenge data 142 to the second device 106. As described above, the challenge data 142 may comprise the signed cryptographic nonce 134, the signed network credential hash 136, and the signed challenge 138.

The second device 106 receives the challenge data 142. As described above, the challenge data 142 may be cryptographically signed by an association server 112. Block 626 verifies the signatures in the challenge data 142. For example, the second device 106 may verify the signature of the signed cryptographic nonce 134, the signed network credential hash 136, and the signed challenge 138. This verification helps confirm the legitimacy of the challenge data 142.

Block 628 generates the challenge response 144 to the signed challenge 138 using the previously stored device-specific secret 128. As described above, where legitimate, the challenge response 144 corresponds to an expected challenge response 140 generated by the association server 112.

Block 630 sends the challenge response 144 to the other device, such as the first device 104. For example, the second device 106 may use the communication interface 408 to transmit the challenge response 144 to the first device 104.

The first device 104 receives the challenge response 144 from the second device 106. As described, the challenge response 144 is based at least in part on a response to the signed challenge 138. Block 632, at the first device 104, verifies the challenge response 144 against the signed expected challenge response 140.

Based at least in part on the verification, block 634 sends the network credentials 146 from the first device 104 to the second device 106.

The second device 106 receives, from another device such as the first device 104, the network credentials 146.

At the second device 106, block 636 verifies the network credentials 146 correspond to the signed network credential hash 136. For example, the hash function may be applied to the network credentials 146 and the result compared to the signed network credential hash 136.

Block 638 configures one or more network connections based at least in part on the verified network credentials 146. The network credentials 146 may now be used to join the second device 106 to the WLAN 108.

In some implementations, the data included in one or more of the credential request 114, the verification request 120, or the verification data 130 may vary. For example, in some implementations, the cryptographic nonce 118 may be omitted from the credential request 114 and the subsequent process. In another implementation, the network credential hash 124 may be omitted from the verification request 120 and the subsequent process.

Figure 8:
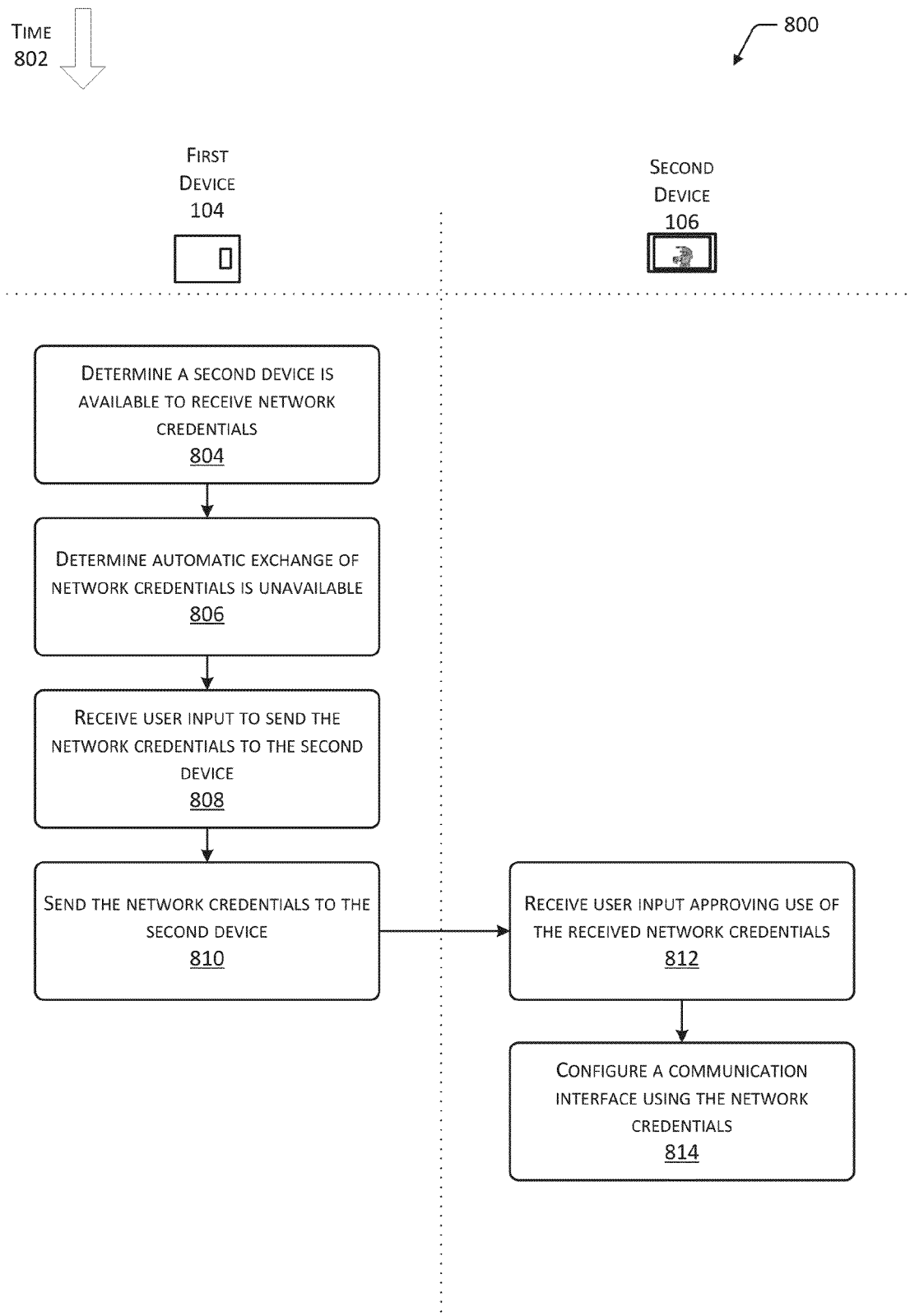
FIG. 8 is a flow diagram of a process of one implementation of secure configuration provisioning with user input.

FIG. 8 is a flow diagram 800 of a process of one implementation of secure configuration provisioning with user input. In some implementations, the automatic provisioning described above with respect to FIGS. 6-7 may be unable to complete. For example, the first device 104 and the second device 106 may not be previously associated in the account data 126, the WAN 110 may be unavailable making the association server 112 inaccessible, and so forth. In these implementations, manual intervention by the user 102 may assist in providing the network credentials 146 to the second device 106.

In this illustration, time increases down the page, as indicated by the arrow 802. Horizontally across the page are the first device 104 and the second device 106. The process may be implemented by these devices.

Block 804, at the first device 104, determines the second device 106 is available to receive the network credentials 146. For example, the second device 106 may have broadcast a credential request 114 which is received by the first device 104.

Block 806, at the first device 104, determines an automatic exchange of the network credentials 146 is unavailable. For example, the first device 104 may be unable to communicate with the association server 112, the account data 126 may indicate no association between the devices, and so forth.

Block 808, at the first device 104, receives user input to send the network credentials 146 to the second device 106. For example, the user interface module 314 on the first device 104 may receive a user selection of a control configured to initiate transmission of the network credentials 146.

Block 810, at the first device 104, sends the network credentials 146 to the second device 106. Block 812, at the second device 106, receives user input approving use of the received network credentials 146. For example, the user 102 may provide input to the user interface module 414 that accepts the received network credentials 146.

Block 814, at the second device 106, configures the communication interface 408 using the network credentials 146. For example, the communication interface 408 may be set to the SSID "MYHOME" and the password of "hello", allowing the second device 106 to join the WLAN 108.

Figure 9:
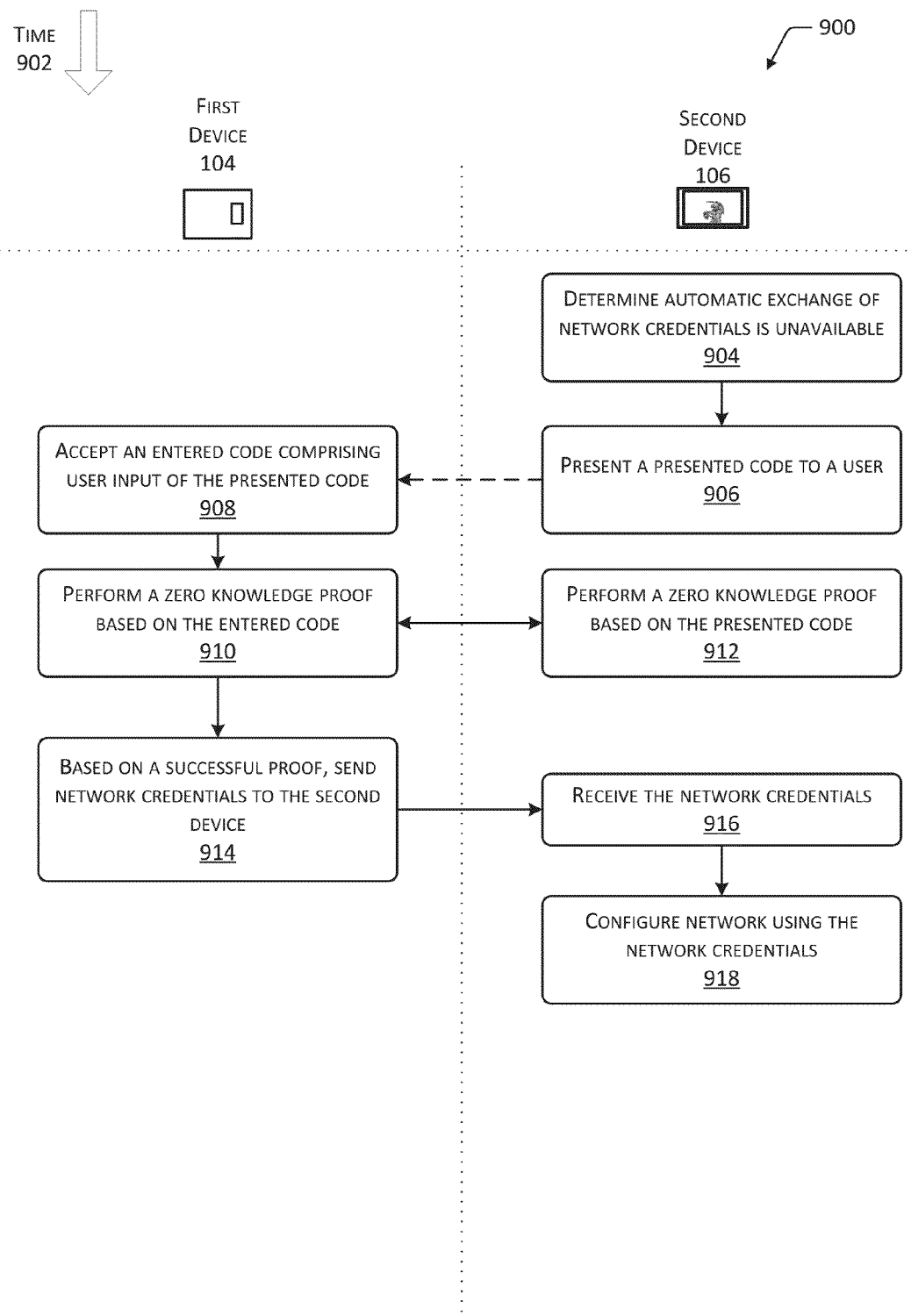
FIG. 9 is a flow diagram of a process of one implementation of secure configuration provisioning with user input using a zero knowledge proof.

FIG. 9 is a flow diagram 900 of a process of one implementation of secure configuration provisioning with user input using a zero knowledge proof. As described above, in some implementations, the automatic provisioning described above with respect to FIGS. 6-7 may be unable to complete. In these implementations, manual intervention by the user 102 may assist in providing the network credentials 146 to the second device 106.

In this illustration, time increases down the page, as indicated by the arrow 902. Horizontally across the page are the first device 104 and the second device 106. The process may be implemented by these devices.

Block 904, at the second device 106, determines an automatic exchange of the network credentials 146 is unavailable. For example, the first device 104 may be unable to communicate with the association server 112, the account data 126 may indicate no association between the devices, and so forth.

Block 906 presents a presented code to the user 102. The presented code may be presented with a user interface provided by the user interface module 414. For example, the presented code may be displayed visually on a display device or light, audibly using a speaker, and so forth. The code may be a string, sequence of shapes, sounds, colors, lights, blink pattern, or other distinctive arrangement of information.

Block 908, at the first device 104, accepts an entered code comprising user input of the presented code. The user input may be received by a user interface provided by the user interface module 314. For example, the user 102 may enter the entered code using buttons presented on a touch sensitive display.

Block 910, at the first device 104, performs a zero knowledge proof based on the entered code. As described above, the zero knowledge proof is based at least in part on the entered code accepted at the first device 104. Likewise, block 912 at the second device 106 performs a zero knowledge proof based on the presented code. The zero knowledge proof is configured to allow a recipient to determine that the sender knows a piece of information, without revealing the information to the recipient. In some implementations, based on a successful proof, a secure connection may be established. For example, SSL or TLS may be used for communications between the two devices which are now known to have the same code.

The zero knowledge proof is analyzed to confirm a successful proof of the presented code. Based on a successful proof, block 914, at the first device 104, sends network credentials 146 to the second device 106. For example, the first device 104 may send this data using a Wi-Fi Direct® connection.

Block 916, at the second device 106, receives from the first device 104 the network credentials 146. Block 918, at the second device 106, configures the communication interface 408 based at least in part on the network credentials 146. In some implementations, the configuration of the communication interface may be based at least in part on the successful proof as determined by the second device 106. The correspondence of the entered code with the presented code indicates that the same user 102 has access to both devices, and may serve as sufficient demonstration that the network credentials 146 should be permitted to be exchanged.

Figure 10:
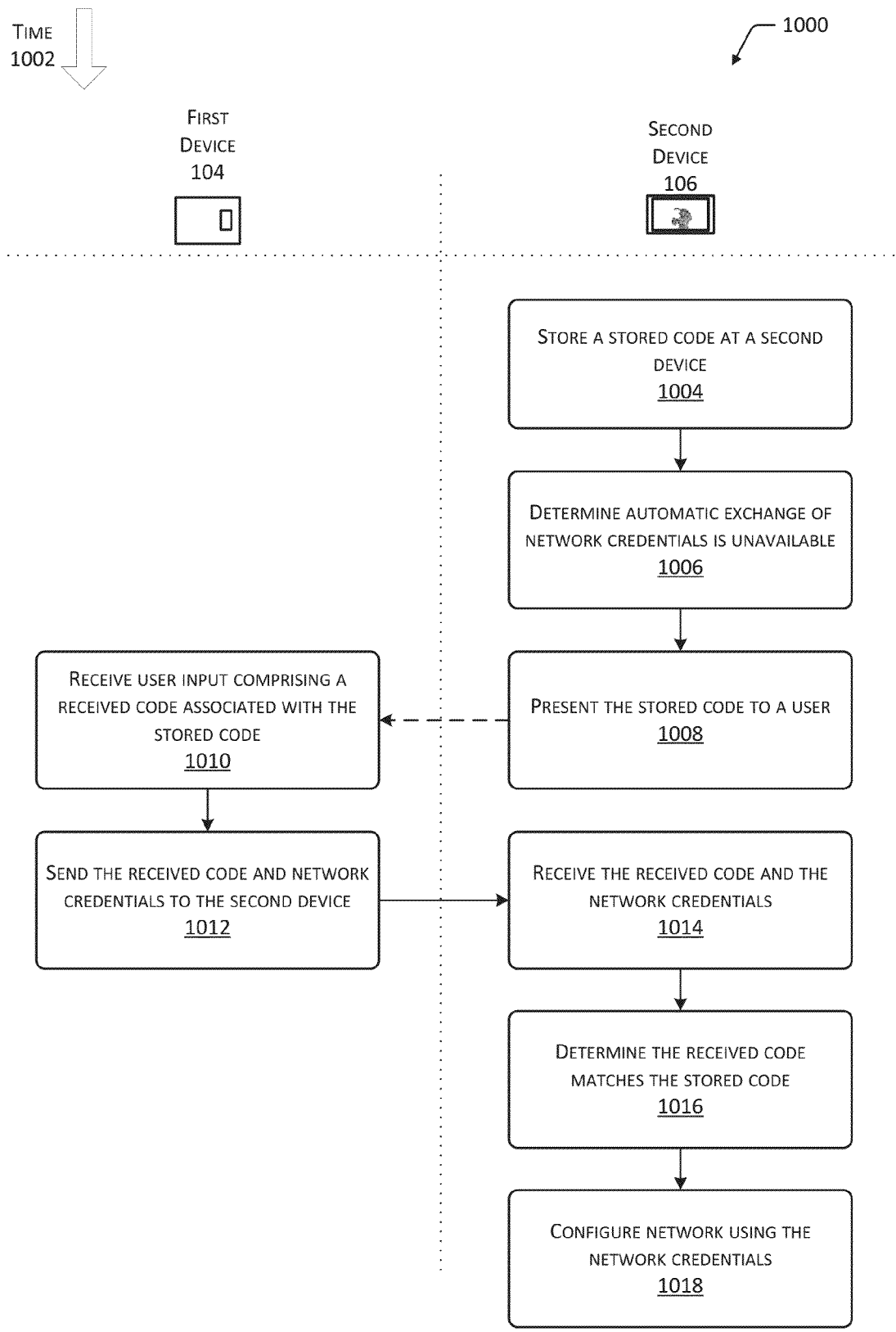
FIG. 10 is a flow diagram of a process of one implementation of secure configuration provisioning with user input.

FIG. 10 is a flow diagram 1000 of a process of one implementation of secure configuration provisioning with user input. As described above, in some implementations, the automatic provisioning described above with respect to FIGS. 6-7 may be unable to complete. In these implementations, manual intervention by the user 102 may assist in providing the network credentials 146 to the second device 106.

In this illustration, time increases down the page, as indicated by the arrow 1002. Horizontally across the page are the first device 104 and the second device 106. The process may be implemented by these devices.

Block 1004, at the second device 106, stores a stored code at a second device. The stored code may be a string, sequence of shapes, sounds, colors, lights, blink pattern, or other distinctive arrangement of information. In some implementations, stored code may be stored in the memory 410 of the second device 106. In other implementations, the stored code may be stored by writing on an object affixed to the second device 106 such as a sticker or nameplate, embossing, etching, or other marking.

Block 1006, at the second device 106, determines an automatic exchange of the network credentials 146 is unavailable. Block 1008 presents the stored code to a user. This presentation may include displaying the stored code visually on a display device or light, audibly using a speaker, and so forth. The stored code may be a string, sequence of shapes, sounds, colors, lights, blink pattern, or other distinctive arrangement of information.

Block 1010, at the first device 104, receives user input comprising a received code. For example, the user input may be of a string of letters and numbers. The received code may be associated with the stored code. For example, the user 102 may see the stored code on a sticker and enters that information using a user interface provided by the user interface module 314.

Block 1012, at the first device 104, sends the received code and the network credentials 146 to the second device 106. Block 1014, at the second device 106, receives the received code and the network credentials 146. Block 1016, at the second device 106, determines the received code matches the stored code. Block 1018, at the second device 106, based at least in part on the determined match configures the communication interface 408 based at least in part on the network credentials 146.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A first device comprising:
a communication interface;
at least one memory storing computer-executable instructions; and
at least one processor configured to couple to the communication interface, access the at least one memory, and execute the computer-executable instructions to:
establish an encrypted connection with a second device using the communication interface;
receive from the second device, using the encrypted connection, a credential request comprising a second device identifier and a cryptographic nonce;
generate a network credential hash based on network credentials and the cryptographic nonce, wherein the network credentials comprise data associated with connecting the second device to a network; wherein the data is indicative of at least one or more of:
a network name associated with the network,
a password associated with the network,
an encryption type associated with the network, or
an encryption key used with the network;
sign a verification request, the verification request comprising the second device identifier, the cryptographic nonce, and the network credential hash;
send the signed verification request to an association server using the communication interface;
receive from the association server verification data using the communication interface, the verification data comprising a signed second device identifier, a signed cryptographic nonce, a signed network credential hash, a signed challenge, and a signed expected challenge response;
send, to the second device using the communication interface, challenge data comprising the signed network credential hash, the signed cryptographic nonce, and the signed challenge;
receive a challenge response from the second device at the communication interface, the challenge response based at least in part on the signed challenge;
verify the challenge response against the signed expected challenge response; and
based at least in part on the verification, send the network credentials to the second device using the communication interface.

2. The device of claim 1, wherein the cryptographic nonce is configured to expire or become invalid after a predetermined period of time.

3. The device of claim 1, wherein data stored at the association server comprises information indicative of the association between the first device and the second device.

4. The device of claim 1, further comprising instructions to:
verify the signatures of the verification data to confirm the verification data originates from the association server.

5. The device of claim 1, wherein the communication interface is configured to communicate with a wireless local area network compliant with at least part of the 802.11 standards promulgated by the Institute of Electrical and Electronic Engineers.

6. A method comprising:
receiving a verification request from, and signed with a signature of, a first device, the verification request comprising a second device identifier and a network credential hash from the first device;
verifying the signature of the first device;

based at least in part on the verification, verify the first device and a second device are associated with a same account;
generating a challenge and an expected challenge response based at least in part on the second device identifier;
signing verification data, the verification data comprising:
the second device identifier,
the challenge, and
the expected challenge response; and
sending the verification data to the first device.

7. The method of claim 6, wherein the expected challenge response is calculated based on a stored device-specific secret associated with the second device.

8. The method of claim 6, the verification request further comprising a cryptographic nonce from the second device.

9. The method of claim 6, wherein the network credential hash is based at least in part on application of a hash function to information used by the first device to connect to a network, the information including one or more of:
a network name associated with the network,
a password associated with the network,
an encryption type associated with the network, or
an encryption key used with the network.

10. The method of claim 6, wherein the network credential hash is based at least in part on application of a hash function to a first device identifier and one or more pieces of information indicative of a network configuration stored by the first device.

11. The method of claim 6, wherein the first device is configured to execute:
receiving the verification data; and
sending, to the second device, challenge data comprising the signed challenge.

12. The method of claim 11, wherein the second device is configured to execute:
receiving the challenge data from the first device;
verifying the signature of the challenge data;
generating a challenge response to the signed challenge using a device-specific secret; and
sending the challenge response to the first device.

13. The method of claim 12, wherein the first device is configured to execute:
receiving the challenge response from the second device;
verifying the challenge response against the signed expected challenge response; and
sending the network credentials to the second device.

14. A computer-implemented method for utilizing processing resources of a requesting device, the computer-implemented method comprising:
generating a cryptographic nonce;
sending a credential request to another device, wherein the credential request comprises:
a requesting device identifier indicative of the identity of the requesting device, and
the cryptographic nonce;
receiving, from another device, challenge data signed by an association server, wherein the challenge data comprises:
a network credential hash based on one or more pieces of information indicative of a configuration to connect to a network, and
the cryptographic nonce;
generating a challenge response to the challenge using a previously stored device-specific secret, wherein the challenge response corresponds to an expected challenge response generated by the association server;
sending the challenge response to another device;
receiving, from the other device, network credentials; and
verifying the network credentials correspond to the network credential hash.

15. The method of claim 14, further comprising:
configuring one or more network connections based at least in part on the verified network credentials.

16. The method of claim 14, wherein the expected challenge response generated by the association server is based at least in part on the device-specific secret.

17. The method of claim 14, wherein the receiving from the other device and the sending to the other device uses a personal area network.

18. The method of claim 14, further comprising:
establishing an encrypted connection with the other device.

19. The method of claim 14, wherein the verified network credentials comprise data indicative of one or more of a service set identification ("SSID") for a wireless local area network, a password associated with the wireless local area network, a wireless channel for the wireless local area network, or encryption used for the wireless local area network.

20. A method comprising:
receiving, from a first device, a verification request comprising a signature and a network credential hash;
verifying the signature of the first device;
based at least in part on the verification, verify the first device and a second device are associated with a same account;
determine a second device identifier;
generating a challenge and an expected challenge response based at least in part on the second device identifier;
signing verification data, the verification data comprising:
the second device identifier,
the challenge,
the expected challenge response, and
the network credential hash; and
sending the verification data to the first device.

21. The method of claim 20, wherein the expected challenge response is calculated based on a stored device-specific secret associated with the second device.

22. The method of claim 20, the verification request further comprising a cryptographic nonce received from the second device.

* * * * *